United States Patent

Cohen-Alloro et al.

[15] 3,659,711

[45] May 2, 1972

[54] DEVICE FOR GRAVIMETRIC SEPARATION OF GRANULAR OR PULVERULENT MATERIALS

[72] Inventors: Richard Cohen-Alloro, Orleans; Jean Grassaud, Boulogne-Billancourt, both of France

[73] Assignee: Bureau de Recherches Geologiques et Minieres, Paris, France

[22] Filed: Mar. 23, 1970

[21] Appl. No.: 20,445

Related U.S. Application Data

[63] Continuation of Ser. No. 784,158, Dec. 16, 1968, abandoned, which is a continuation-in-part of Ser. No. 621,300, Mar. 7, 1967, abandoned.

[30] Foreign Application Priority Data

Mar. 26, 1966  France .................................... 55139

[52] U.S. Cl. .............................. 209/457, 209/486, 209/495, 209/497
[51] Int. Cl. ............................................. B03b 3/22
[58] Field of Search .......... 209/172, 425, 427, 468, 455–457, 209/469, 475, 486, 494, 500, 506, 454

[56] References Cited

UNITED STATES PATENTS

| | | | |
|---|---|---|---|
| 124,578 | 3/1872 | Huet | 209/455 |
| 190,324 | 5/1877 | Hooper | 209/425 |
| 886,152 | 4/1908 | Pfau | 209/455 X |
| 914,002 | 3/1909 | Woodbury | 209/457 |
| 1,225,157 | 5/1917 | Moyer | 209/427 |
| 1,516,338 | 11/1924 | Damon | 209/455 X |
| 2,052,431 | 8/1936 | Wade | 209/500 X |
| 2,132,377 | 10/1938 | Bird | 209/500 |
| 2,140,917 | 3/1939 | Foulke | 209/172 |
| 2,828,015 | 3/1958 | Vissac | 209/455 |
| 2,968,405 | 1/1961 | Veres | 210/496 |
| 1,354,550 | 10/1920 | Glockmeier | 209/486 X |

*Primary Examiner*—Frank W. Lutter
*Assistant Examiner*—Ralph J. Hill
*Attorney*—Sughrue, Rothwell, Mion, Zinn & Macpeak

[57] ABSTRACT

A device for gravimetric separation of granular or pulverulent materials includes a means for creating a series of reciprocating pulsations in a fluid, either air, water or a dense liquid. This pulsating fluid passes through a porous bottom which has pores sufficiently small to retain the dense particles, and means allowing the retention of the dense products. The porous bottom includes a regulatable flow aperture system for the continuous evacuation of the dense products. The products to be treated are poured into a feed channel loading to the porous bottom. A regulatable feed plate above the porous bottom allows regularizing flow of the raw materials. A pouring sill for the light materials is replacable by others which vary in height. The amplitude of the pulsations are system regulatable. A trap is situated in the lower part of the tank.

4 Claims, 6 Drawing Figures

PATENTED MAY 2 1972 3,659,711
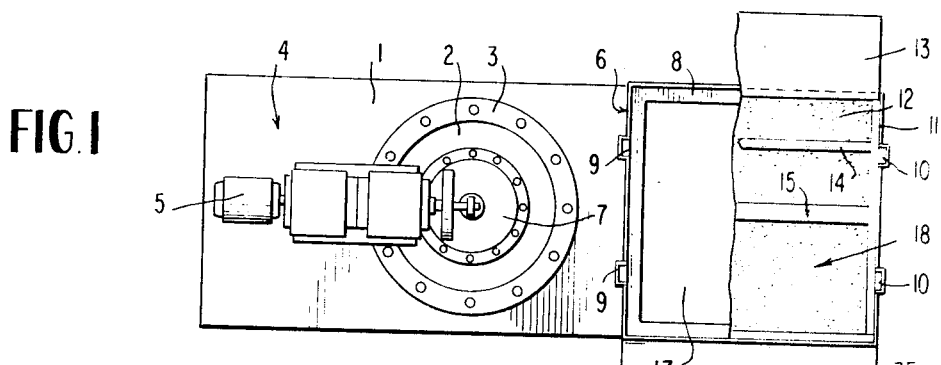
FIG.1
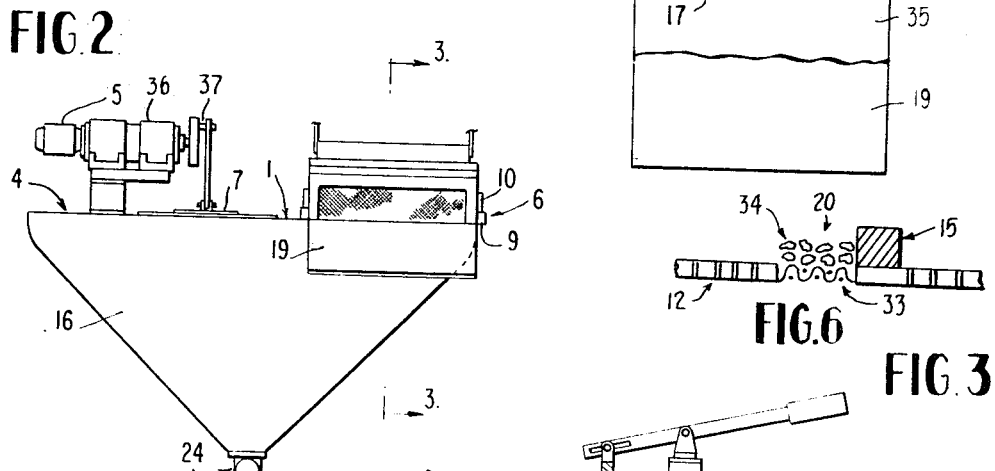
FIG.2
FIG.6
FIG.3
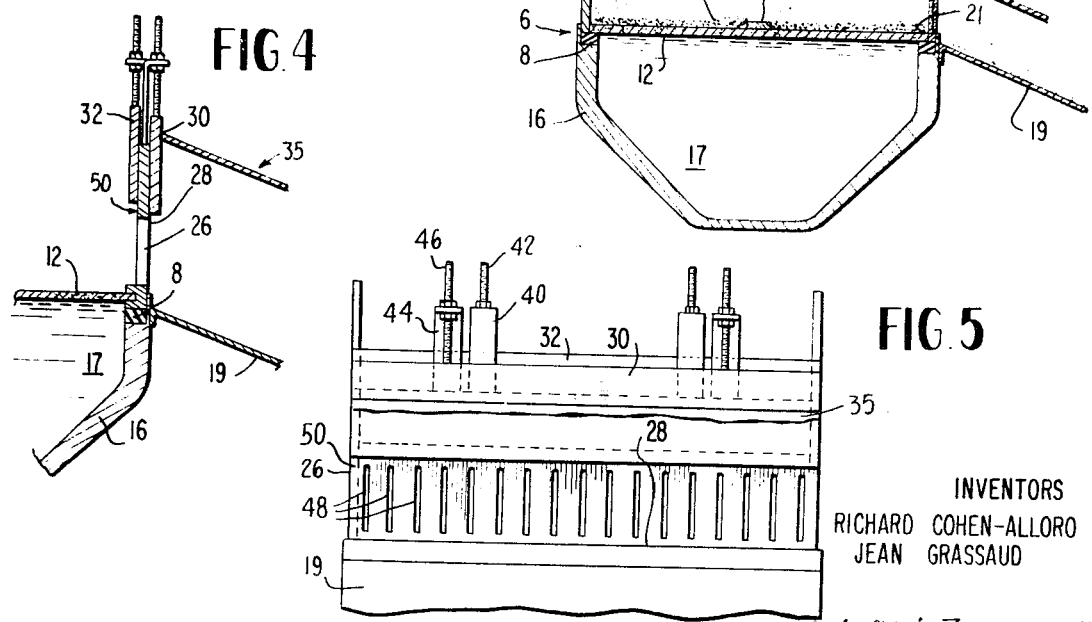
FIG.4
FIG.5
INVENTORS
RICHARD COHEN-ALLORO
JEAN GRASSAUD
BY Sughrue, Rothwell, Mion, Zinn & Macpeak
ATTORNEYS

DEVICE FOR GRAVIMETRIC SEPARATION OF GRANULAR OR PULVERULENT MATERIALS

CROSSREFERENCE TO RELATED APPLICATIONS

This application is a streamlined continuation of a continuation-in-part application, Ser. No. 784,158, Filed Dec. 16, 1968, and now abandoned. The parent application, Ser No. 621,300 was filed on Mar. 7, 1967, now abandoned and claims priority from a French Patent Application filed Mar. 26, 1966.

FIELD OF THE INVENTION

The present invention concerns an improved device intended to separate by density a granular or pulverulent raw material into two fractions and more especially a device wherein the densimetric separation is effected under the action of pulsations transmitted by water or possibly by air.

DESCRIPTION OF THE PRIOR ART

Devices of this kind, known under the name of diaphragm-tanks, comprise essentially an impelling arrangement, for example: a flexible membrane actuated by reciprocating movement intended to impart to the air or to the water as the case may be, pulsations, and a filter bed constituted by hollow iron balls or selected mineral particles intended to create a dense medium.

This bed expands and contracts successively with the rhythm of the pulsations created by the impelling arrangement, in such a way that a certain densimetric separation is produced, the densest granules falling through the filter bed.

Such devices in fact only allow the treatment of ores having a definite content. They also have the disadvantage of only functioning at a constant rate after a preliminary feeding of fairly long duration. These devices are thus not suited either to very poor ores or to a discontinuous operation, as is necessary during a prospecting campaign. Moreover the granulometric class treated is relatively narrow.

SUMMARY OF THE INVENTION

This invention provides a device for gravimetric treatment of granular or pulverulent materials able to function, due to the combination of a regulatable impelling arrangement and of a porous bottom of fixed or regulatable pitch, either in a dry or in a humid medium and in particular in the presence of a dense liquid, the functioning taking place in continuous or discontinuous operation without practical diminution of the yield, and has the ability to treat materials including very poor ores and broad ranges of particle-sizes.

This invention provides a new process according to which the dense granules, separated by the effect of the pulsations (both positive and negative) transmitted by a fluid passing through a porous bottom, are accumulated above calibrated particles of predetermined mesh size of the ore to be separated for example, these particles being situated above a mesh, so that the dense granules pass through these particles during the oscillations of the fluid and are eliminated through the mesh.

Further features and characteristics of the invention will appear from the following description taken with the accompanying drawing which represents by way of example, the best mode of the present invention.

BRIEF DESCRIPTION OF THE DRAWINGS

FIG. 1 represents a diagrammatic plan view of the device with sections cut away for clarity.

FIG. 2 is a side elevational view of the device.

FIG. 3 is a section view taken substantially along the line 3—3 of FIG. 2.

FIG. 4 is an enlarged sectional view of a modification of the adjustable height sill.

FIG. 5 is an enlarged elevational view of the modification of the sill of FIG. 4.

FIG. 6 is a sectional view of the filter bed, mesh and transverse riffle.

BRIEF DESCRIPTION OF THE INVENTION

Referring to FIGS. 1 - 3, a framework 1 of the device serves as the main support wherein a flexible membrane 2 is positioned. The membrane is fixed to the framework by a ring 3. One side 4 of the framework serves as a base for a motor and clutch assembly 5 while the other side forms a rectangular frame 6, on which is mounted a porous frame assembly 11.

The lower part of the device, situated below the framework 1 and the frame 6, form an impermeable tank 16 able to be filled with any fluid.

The motor and clutch assembly 5 also includes a mechanical linkage articulated on reinforced part 7, positioned at the center of the membrane 2, so as to communicate thereto a reciprocating vertical movement. This assembly further includes a speed-changer 36 intended to regulate the frequency of the reciprocating movement and an arrangement 37 for regulating the amplitude of this movement, therefore, of a type that is well known in the art as illustrated, for example in the U.S. Pat. No. 886,152(1908).

The frame 6 is edged all along its upper part by a strip of rubber 8 or of any other material presenting a suitable elasticity and impermeability to allow sealed application of the porous frame assembly 11 which carries a porous bottom member 12, such as shown in FIG. 3, the fixing of which is effected by means of the catches 9 engagable with flanges 10 on the assembly 11.

The porous bottom 12 of the frame 11 comprises, for example, a sintered bronze plate. A feed channel 13 is provided adjacent the rear edge of he frame assembly 11 and is formed as an inclined plane.

A feed plate 14, the distance from the upper edge of which to the porous bottom 12 is variable by the lever and handle assembly shown in FIG. 3, is provided to control the flow of the materials to be treated. A cross-piece 15 extends across the assembly 11 to lend support to the porous bottom 12 and provide an abutment therealong. The frame assembly 11, which has the feed channel 13 and the porous plate 12 attached thereto, rests on the rubber strips 8 which edge the frame 6. The tank 16 extends below the porous bottom 12 and the membrane, as shown in FIG. 2, to transmit pulsations in the fluid therebetween. The device can function either in a dry or in a wet mode, as shown in the drawing, with the tank 16 being filled with water or liquid 17.

When the motor assembly 5 communicates a vertical reciprocating movement to the flexible membrane 2, this movement is transmitted to the bed of the ore by the liquid 17 which circulates through the porous plate 12.

Thus the materials to be separated, poured into the feed channel 13, pass below the feed plate 14 and are subjected to the action of the successive pulsations of positive half-negative pressure communicated from the membrane 2. The heavy granules and the light granules are graduated or sorted in superposed layers according to their respective densities. The light products which float in an upper part 18 of this fluid system follow the stream and flow over pouring sill 22 into the channel 19. The heavy granules remain in contact with the porous bottom 12 where they accumulate at 20 and 21 throughout the operation.

The height of the pouring sill is regulated depending on the nature of the raw material, on its content in heavy products and on the feeding flow. To this end, additional members 23 of various heights can be used on top of the sill 22. By way of example, for a raw material having a particle-size between 0 and 5 mm., a sill of 30 mm. can be used.

When the device functions dry, a considerable pitch is given to the porous plate. The variation of pitch is obtained by any appropriate known means, and the control arrangement has not been shown.

It is important to note that under the combined effect of the pulses of pressure and suction on the one hand and the fineness of the pores of the porous plate on the other hand, only dense granules can remain on the bottom 12. The densimetric separation is thus effected starting with the operation of the device and this separation continues to progress throughout the transportation of the materials across the frame 11 to the pouring sill 22. A stable system being established from the starting of the device, it is then possible, due to this new process, to undertake prospecting campaigns necessitating a rapid succession of numerous densimetric separation operations, effected on materials of very various volumes and of different kinds, which was not possible with any other device due to the fact that the light particles do not contaminate the liquid beneath the porous plate.

When the device functions discontinuously, as has just been indicated, it is clear that the withdrawal of the dense materials accumulated at 20 and 21 can be effected manually.

Moreover due to the continuous densimetric separation which takes place all the time and which allows the dense granules to be freed from the light granules, fine dense granules of very small diameter can pass through the pores of the porous bottom 12 and accumulate and be collected in the lower part of the tank 16. A trap arrangement 24 may therefore be installed in the tank in order to collect the practically pure, fine, dense granules thus selected. According to the modification shown in FIGS. 4 and 5 and 6, the functioning of the device in continuous operation is improved by combining, according to the invention, the process that has just been described, that is the separation process which accumulates coarse dense granules at 20 and 21 of the device illustrated in FIG. 3 with a method of removing those particles accumulated at those various points. As illustrated in FIG. 6 the transverse riffle 15 is positioned on the porous plate 12 and extends generally transverse to the general circulation of the materials for retaining the coarse dense granules at 20. The porous plate 12 includes a mesh 33 for supporting a bed of calibrated ore particles 34 of predetermined mesh size that allows the coarse dense granules to pass. Coarse dense particles will accumulate on the upstream side of the transverse riffle 15 and pass downward through the bed of calibrated ore particles 34 and the mesh 33.

For removal of the coarse dense particles at point 21, the tank incorporates an adjustable pouring sill edge 28 and an adjustable aperture system 26. The pouring sill edge 28 is vertically adjustable by a plate 32 suspended on threaded brackets 40 by a pair of studs 42. The aperture system 26 includes a slotted plate 50 and is adjustable by a plate 30 suspended on a threaded bracket 44 by a pair of studs 46. The plate 30 is capable of vertical adjustment to regulate the flow through the slots 48. A pair of channels 19 and 35 of a type that is well known in the art as illustrated for example in the U.S. Pat. No. 2,052,431, receives respectively, the separated coarse dense particles and the waste light particles. Similarly, a plate 32 may be adjusted vertically upward or downward to raise or lower the upper edge of the pouring sill. In this way a continuous evacuation of the separated ore is achieved. The frequency of the oscillations of the membrane is regulated as a function of the granulometric constitution and the nature of the constituents. It can be in the order of 300 cycles per minute and increase greatly in the case of a slight variation in density of the materials.

Moreover the amplitude of the oscillations of the membrane can be regulated so as to cause the amplitude to vary from 3 to 10 mm. or beyond, as required. The amplitude can be as great as the bed is thick. As to the flow of water or of the liquid used, it obviously depends on the circulation of the products.

According to the invention, the yield may be further improved by using liquids of high density. In this case, the variations in density between liquids and materials to be separated are slighter and the flotation of the granules of low density is effected more rapidly. The liquid used preferably has a base of tetrabromethane, the density of which is 3. The results show in particular a large increase in the yield obtained above all in the case where the form factors of the products to be separated are unfavorable. The liquid or the pure tetrabromethane is recovered beyond the pouring sill.

Although there has been described only one embodiment of the present invention, it is clear that numerous additions, substitutions or omissions could be made in the various components of the apparatus without thereby departing from the scope of the present invention.

Thus the porous plate in sintered bronze can be replaced by a plastic material containing holes or pores, this component being supported by a grating. Moreover, the nature of the materials forming the frame and the channel can be adapted to the conditions of use, alloys resisting corrosion by sea-water if the prospecting is carried out at sea, for example. In the same way, the calibrated blocks of ores used for the continuous evacuation of the dense products could be replaced by materials of similar density and appropriate form.

What is claimed is:

1. A device for gravimetrically separating dense material from light material by reciprocating pulsations of a fluid comprising; a framework including a vat containing a fluid; means for communicating pulsations to the fluid; a porous plate attached to the vat and providing a separation surface for retaining the dense material while permitting the light material to respond to the fluid pulsations and to form a layer above the dense material; a feed means located above the porous plate to feed the material to be treated onto the porous plate; a transverse riffle extending across the porous plate and downstream of the feed means; the porous plate further including a mesh zone adjacent and upstream of the transverse riffle to permit at least a portion of the dense material to pass to the bottom of the vat; the mesh aperture size being large enough to permit the dense material to pass through; a filter bed of calibrated ore particles, the particle size of the filter bed being larger than the mesh aperture size to permit the filter bed to be located above and supported by the mesh zone; aperture means located on a side of the vat adjacent the porous separating surface downstream of the transverse riffle to allow any remaining dense material to be removed from the vat through the aperture means, and discharge means for removing the light material from the vat at a point located above the aperture means.

2. A device as claimed in claim 1, the feed means comprising a hopper having an adjustable feed plate which is adjustable in distance from the porous separating surface to regulate the feed of material.

3. A device as claimed in claim 1, wherein the discharge means is a regulatable pouring sill on a side of the vat comprising at least one adjustable plate to regulate the height of the pouring sill.

4. A device as claimed in claim 3, wherein a second adjustable plate regulates the size of the aperture means.

* * * * *